United States Patent [19]
Mills et al.

[11] Patent Number: 5,191,949
[45] Date of Patent: Mar. 9, 1993

[54] WEIGHING APPARATUS WITH AN ADJUSTABLE RATIO OF STRESSES IN THE LOAD BEARING MEMBERS

[75] Inventors: Nigel G. Mills, Inman, S.C.; Ronald J. Gaines, Worthington, Ohio

[73] Assignee: Mettler-Toledo, Inc., Worthington, Ohio

[21] Appl. No.: 724,833

[22] Filed: Jul. 2, 1991

[51] Int. Cl.$^5$ ............................................. G01G 3/08
[52] U.S. Cl. ................................. 177/229; 177/210 C
[58] Field of Search ............................. 177/210 C, 229

[56] References Cited

U.S. PATENT DOCUMENTS

| | | | |
|---|---|---|---|
| 3,709,310 | 1/1973 | Cooke et al. | 177/168 |
| 3,889,768 | 6/1975 | Hejzlar | 177/229 |
| 4,179,004 | 12/1979 | Ebbinge | 177/211 |
| 4,240,289 | 12/1980 | Saner | 73/141 R |
| 4,300,648 | 11/1981 | Gallo et al. | 177/229 |
| 4,343,196 | 8/1982 | Wirth et al. | 73/862.62 |
| 4,382,479 | 5/1983 | Lee et al. | 177/189 |
| 4,450,922 | 5/1984 | Alexandre | 177/211 |
| 4,485,881 | 12/1984 | Tramposch et al. | 177/211 |
| 4,509,610 | 4/1985 | Hayashi | 177/211 |
| 4,587,853 | 5/1986 | Komoto et al. | 177/210 FP X |
| 4,614,245 | 9/1986 | Yamanaka | 177/210 FP |
| 4,657,097 | 4/1987 | Griffen | 177/211 |
| 4,799,561 | 1/1989 | Komoto | 177/229 |
| 4,838,369 | 6/1989 | Albert | 177/210 FP |

FOREIGN PATENT DOCUMENTS 2215620 3/1974 Fed. Rep. of Germany.
2552170 11/1975 Fed. Rep. of Germany.

*Primary Examiner*—Benjamin R. Fuller
*Assistant Examiner*—Randy W. Gibson

[57] ABSTRACT

A spring formed as a Roberval-based frame of conventional material is combined with a smaller sensor in the form of a deflectable load cell of material such as a ceramic. The combination associates the higher load capacity spring with the sensor capable of performing in a manner substantially free of system error. A method for configuring the assembly for optimal system error rejection is described wherein a transmission beam carrying out a load sharing function exhibits a stress selectively greater than the average stress exhibited by the spring.

44 Claims, 7 Drawing Sheets

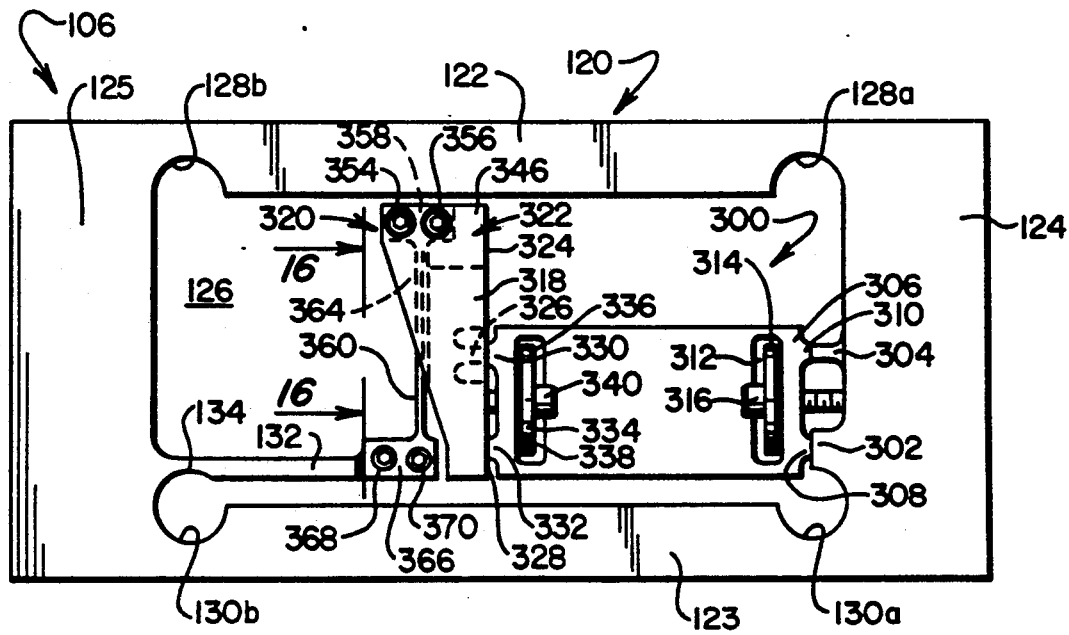
FIG. 15
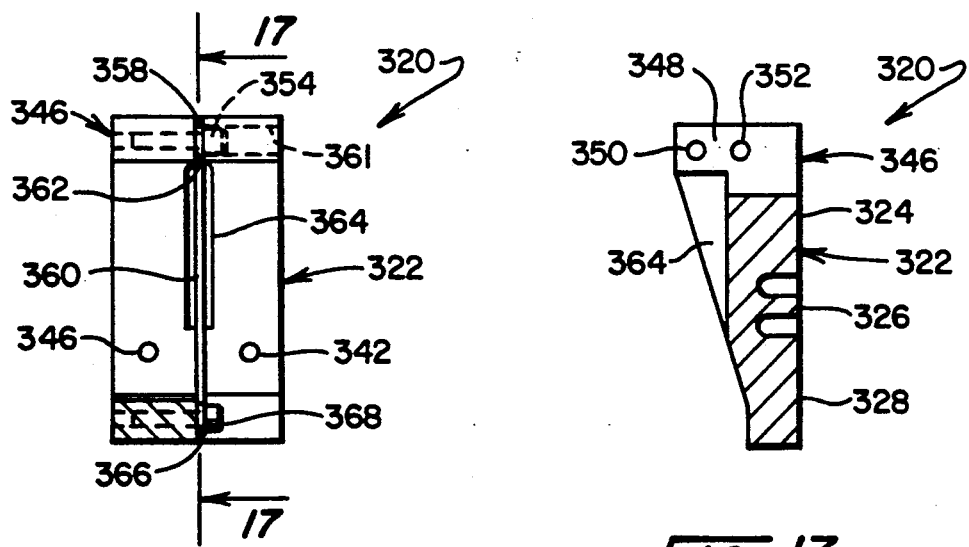
FIG. 16
FIG. 17

WEIGHING APPARATUS WITH AN ADJUSTABLE RATIO OF STRESSES IN THE LOAD BEARING MEMBERS

BACKGROUND OF THE INVENTION

Investigators in the weighing arts seeking to improve the range and accuracy of force measuring devices are called upon to consider and attempt to compensate or to correct for a variety of phenomena. Such phenomena, for example, have been identified as drift, anelastic creep, hysteresis, load position sensitivity, environmental contamination, temperature effects, and the like, and are observed to continue to pose design constraints and operational limitations.

Typically, a force measuring device will be configured having a weight or load platform supported, in turn, by a load cell positioned within a force transfer path extant between loads applied to the platform and the device or scale. The load cell generally is provided as a structure or "counterforce" which is stressed by the application of force within the force transfer of communication path and responds thereto in strain which is instrumented via, for example, strain gauges to provide a weight responsive output.

The phenomenon noted as "creep", as is encountered in the use of load cells, typically is manifested as change, either an increase or decrease, in the output of the load cell with time under an applied load. When the load is removed, the cumulative change is output, i.e. the anelastic creep error, is seen to remain then decrease with time. A hysteresis effect is one associated with the random utilization of weighing devices wherein loads are applied and then removed in any of a myriad of sequences. Where such load and partially unload or reload sequences occur, the outputs or readings of the scales will evidence discrepancies at the same minimal load which are termed a hysteresis effect. Load position sensitivity is an output discrepancy which is occasioned with the positioning of a load at different locations on the scale platform. Such position may, without correction, evolve moments or torques within the load cell structure to adversely affect the output signals therefrom. Environmental contamination generally is accommodated for with some form of encapsulation, i.e. hermetic sealing of the instrumentation of a scale structure. Such protection often is required in view of the industrial environments in which scales typically are employed. The design of such environmental protection often has led to large bulksome structuring or has induced difficulties, inasmuch as the encapsulating structure itself may adversely affect the performance of a load cell structure.

Anelastic creep and hysteresis effects particularly have been associated with load cells utilizing strain gauge based instrumentation. Approaches in avoidance of the phenomena have used piezoelectric and vibrating wire resonator sensors, which have less load bearing capacity than strain gauge based load cells, in conjunction with "load sharing" devices. Such load sharing devices are structured to assert only a lesser but proportionate component of the applied load upon the vibrational or resonant sensor through a transmission beam or its equivalent.

In general, the very rigid resonator based on vibrating wire based sensing approaches pose difficulties in implementation due to their inherent delicacy and the difficulties of their protection with respect to environmental effects and the like.

Another approach to minimizing the hysteresis and creep effects has been to improve the quality of the load cell counterforce material. For example, lower levels of creep or hysteresis are exhibited by forming the counterforces of such materials as beryllium-copper, quartz or glass/ceramic materials. However, to the present time, these approaches are considered overly-expensive for employment with scale structures intended for conventional utilization. Of particular importance, counterforces formed of such somewhat exotic materials are subjected to certain manufacturing difficulties, particularly in terms of severe restrictions on their size and thus their load range capabilities. Generally, where such size limitations are present, the smaller load cells formed of such materials tend to be load position or moment sensitive.

A common load cell counterforce geometry is one incorporating a guided beam or Roberval approach. The guided beam is structured such that, when loaded, it is counterpoised by a moment with a result of no beam end rotation. Conventional Roberval based load cells will be formed as a parallelogramic frame counterforce which is instrumented with strain responsive sensors such as strain gauges. Formed generally from readily fabricable and convenient material such as aluminum, the guided beam based load cells exhibit a desirably improved performance with respect to the avoidance of load position or moment insensitivity.

Investigators have found that additional performance errors, for example hysteresis and creep, theoretically can be cancelled or minimized where the guided beam frame incorporates a load sharing feature as above described, but wherein the transmission beam is employed to impart a proportionate share of the applied load under a condition wherein the average stress within the transmission beam is equated to that in the frame. The controlled stress of the frame or Roberval mechanism typically is established at reduced beam sections, as is the average stress at a correspondingly reduced section of the transmission beam. However, such desired error cancellation has been determined to occur only where the sensor acted upon by the transmission beam, is rigid or theoretically infinitely stiff. The above-noted vibrating wire, for example, has been employed to meet this requirement of sensor rigidity. However, such infinitely stiff sensing mechanisms, when so employed, are accompanied by the above-noted drawbacks.

SUMMARY

The present invention is addressed to apparatus for weighing or measuring a load and an associated method for system error rejection. Such apparatus combines the ideal but load limited performance of a sensor, provided as a load cell having a counterforce formed, for example, of highly selective metals or of non-metals such as ceramics, with a larger load receiving spring exhibiting greater load capacity. Operative association between the larger spring and the sensor is by select load sharing provided by a transmission member configured with the spring to apply proportionate force to the sensor. Through a unique, stress-based configuration of these components, system error rejection for the combination structure can be optimized. With this optimization procedure, the stress exhibited by the transmission member under load is selected as greater than the corresponding average stress exhibited by the spring by an optimizing factor which is greater than unity. The result of such optimization is a weighing apparatus which enjoys the advantageous error free attributes of smaller, materials-limited devices with larger, higher load capacity structures. This combination is more robust for use in more practical weighing applications and is amenable to more practical designs for minimizing environmental contamination phenomena and the like.

Another feature of the invention is to provide weighing apparatus for measuring load force applied to a receiving portion thereof and having a force communication path to ground. The apparatus includes a first spring within the force communication path, coupled in force transfer relationship between the receiving portion and ground and deflectable under the load force to exhibit a first value of stress for providing force transfer response to the load force. A sensor is provided within the path and is deflectable under an applied force to generate an output correlatable with the force value of the load force. Additionally, a transmission spring is provided within the path in parallel force path relationship with the first spring and in series force path relationship with the sensor for the function of asserting an applied force upon the sensor while exhibiting a second value of stress greater than the first stress value exhibited by the first spring by an amount effective to cause substantial cancellation of error within the weighing apparatus including the first spring and the transmission spring.

Another aspect of the invention provides a method for optimizing the rejection of system error within a weighing mechanism having a receiving portion for receiving a load, a first spring and a sensor within a force transfer path extending from the receiving portion to ground, comprising the steps of:
  providing the first spring in series force transfer relationship between the receiving portion and ground;
  configuring the first spring to have an average first stress under the load;
  providing a sensor in series force transfer relationship within the path between the receiving portion and ground and in parallel force transfer relationship with the first spring within the path for providing an output signal corresponding with the load;
  providing a transmission member within the path in series force transfer relationship with the sensor to assert the applied force thereon and in parallel force transfer relationship with the first spring; and
  configuring the transmission member to have a second stress greater than the average first stress by an amount effective to cause substantial cancellation of system error.

A further aspect of the invention provides weighing apparatus for measuring the weight of a load. The apparatus includes a first spring having a receiving portion for receiving the load in force transfer relationship and which is present within a force transfer path extending to ground. A sensor is provided which is elastically deflectable under an applied force and includes a transducer responsive to the deflection to generate an output corresponding with the load weight. A transmission member is included with the apparatus which is coupled in series force transfer relationship with the sensor and in parallel force transfer relationship with the first spring within the force transfer path and is configured for effecting assertion of the applied force to the sensor.

Another feature of the invention provides a method for making apparatus for measuring the weight of a load which comprises the steps of:
  providing a first spring, having a receiving portion for receiving the load in force transfer relationship;
  positioning the first spring within a force transfer path extending to ground;
  providing a sensor elastically deflectable under an applied force to generate an output corresponding with the load weight;
  providing a transmission spring configured for effecting assertion of the applied force to the sensor;
  positioning the sensor and the transmission spring within the force transfer path; and
  coupling the transmission spring in series force transfer relationship with the sensor and in parallel force transfer relationship with the first spring.

Another feature of the invention provides weighting apparatus for measuring the weight of a load. The apparatus includes a first spring having a receiving portion for receiving the load within a force transfer path and configured with parallel, spaced beam components and spaced uprights extending therebetween to define a frame having an opening. A sensor is provided in parallel relationship with the first spring within the force transfer path. The sensor has spaced parallel beam components within a parallelogramic frame symmetrically disposed about a central plane within the opening of the first spring and extending longitudinally between a fixed end and a deflectable end receiving an applied load for deriving an output corresponding with the load. A transmission beam is provided within the path and is situate within the opening of the spring component. The transmission beam has a fixed end and extends therefrom to an oppositely disposed deflecting end having a first connector surface facing outwardly through the opening. A mounting arrangement is provided within the first spring opening which is fixed to and movable with the sensor and has a second connector surface facing outwardly through the opening and in alignment with the first connector surface. A force rod including first and second connector portions facing and accessible through the first spring opening is provided. The first connector portion is connected with the first connector surface and the second connector portion is connected with the second connector surface and configured for conveying the applied load.

Another feature of the invention provides weighing apparatus for measuring the weight of a load which includes a sensor formed of a first material, configured having spaced, parallel beam components extending longitudinally between one upright at a deflectable end and another upright at a fixed end. A spring or support assembly is provided, formed of a second material, which includes a stud component having an upwardly disposed receiving surface and an oppositely disposed contact surface. The sensor is configured additionally having an integrally formed first compression mount including first and second vertically oppositely disposed mounting surfaces located adjacent the fixed end, isolated from the beam components by oppositely disposed slots located therebetween and the second mounting surface is positioned in abutting adjacency with the support assembly upwardly disposed receiving surface. A mounting arrangement is included for providing compressive retention between the compression mount first surface and the stud component contact surface.

Another feature of the invention provides weighing apparatus for measuring the weight of a load which includes a sensor configured having spaced, parallel beam components extending between one upright at a deflectable end and another upright at a fixed end. A support assembly is provided having a vertically disposed connection portion. The sensor further is configured having a first connector opening adjacent the fixed end defining a contact surface adjacent one of the uprights. A mounting assembly is provided including a compression plate positioned within the first connector opening, having contact components therewith positioned in compressible contact abutment with the first contact surface and a first compressing connector arrangement is provided extending between the first compression plate and the support assembly vertically disposed connection portion for compressively retaining the sensor end against the connection portion.

Another feature of the invention provides weighing apparatus for measuring the weight of a load. The apparatus includes a sensor configured having spaced, parallel beam components extending between one upright at a fixed end and another upright of predetermined vertical extent at a deflectable end. A support assembly is included having a vertically disposed portion fixed in supporting relationship to the upright adjacent the sensor fixed end and a mounting block is provided having a first mounting portion engageable with a sensor upright at the deflectable end thereof and extending upwardly therefrom a predetermined lengthwise extent greater than the predetermined vertical extent to a second mounting portion generally normally disposed outwardly from the first mounting portion. A connector arrangement is provided for coupling the mounting block first mounting portion with the sensor upright at the deflectable end. A force rod of length substantially coextensive with the predetermined distance is provided which extends between a first connector portion coupled to the mounting block second mounting portion and a lower disposed second connector portion connected with a load conveying assembly.

Another feature of the invention provides weighing apparatus for measuring the weight of the load. The apparatus includes a sensor configured having spaced, parallel beam components extending between one upright at a fixed end and another upright at a deflectable end, the uprights being symmetrically disposed about a central plane. A support assembly is provided having a vertically disposed portion fixed in supporting relationship to the upright adjacent the sensor fixed end. A mounting block is included having a mounting portion engageable with the sensor upright at the deflectable end and a first connector surface adjacent to and parallel with the central plane. A connector arrangement is included for coupling the mounting block mounting portion with the sensor upright at the deflectable end. A force rod is provided including first and second spaced connector portions, the rod being symmetrically disposed about the central plane, the first connector portion being connected with the first connector surface and the second connector portion being connected with a second connector surface of a load conveying assembly.

Other objects of the invention will, in part, be obvious and will, in part, appear hereinafter.

The invention, accordingly, comprises the apparatus and method possessing the construction, combination of elements, arrangement of parts, and steps which are exemplified in the following detailed disclosure. For a fuller understanding of the nature and objects of the invention, reference should be had to the following detailed description taken in connection with the accompanying drawings.

BRIEF DESCRIPTION OF THE DRAWINGS

FIG. 15 is a side elevational, partially schematic view of a weighing apparatus according to the invention showing another embodiment for sensor mounting;

FIG. 16 is a partial sectional view taken through the plane 16—16 shown in FIG. 15; and FIG. 17 is a partial sectional view taken through the plane 17—17 shown in FIG. 16.

DETAILED DESCRIPTION OF THE INVENTION

In the disclosure to follow, a generalized description of load receiving guided beam based spring geometries and their configurations which incorporate load sharing features initially is set forth. The latter features are uniquely combined with smaller capacity but highly error free sensors implemented as non-metallic or ceramic based counterforce devices which react elastically to deflect under force imposed by load sharing to derive a force measuring output or readout. Following this general description, an analysis revealing the optimization of product design with respect to system error otherwise encountered with deflectable sensing components within the load sharing combinations is set forth. Lastly, the practical design and structural aspects of weighing device representing preferred embodiments are illustrated and described.

Figure 1:
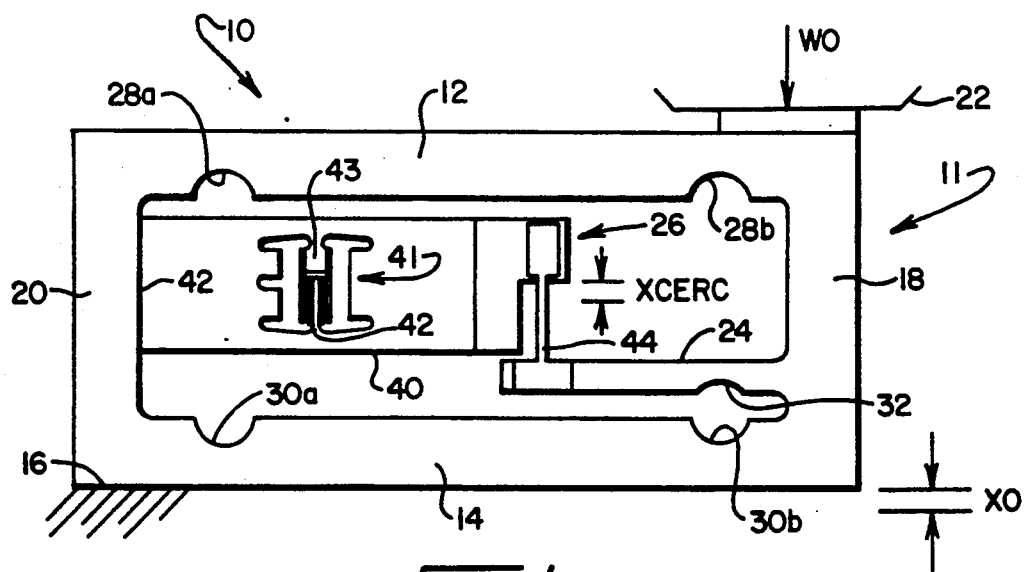
FIG. 1 is a schematic representation of a weighing apparatus embodying the invention.

Turning to FIG. 1, a weighing structure embodying this invention is revealed generally at 10. The structure 10 employs a guided beam or Roberval spring 11 including upper beam component 12 and lower beam component 14, one end of which at 16 is represented as being rigidly supported. Two integrally formed uprights 18 and 20 associated the beam components 12 and 14 in parallelogramic fashion, such that they perform as guided beams in conjunction with the imposition, for example, of a weight, designated W0, at a receiving portion 22 of structure 10. In general, a guided beam is one which, when loaded with a weight such as W0, will be counterpoised with moment such that there is no rotation of the end or tip of the beam. See generally: "Mechanics" by Roark and Young, Fifth Ed. (19734) McGraw-Hill Book Co., New York, N.Y.

By employing a transmission member such as beam 24 shown integrally formed with spring 11 and extending from upright 18, a portion of the load W0 may be imparted to a load sensor of relatively small load capacity. This arrangement permits the weighing of larger load values W0 with relatively smaller and more delicate sensors. In this regard, a sensor herein associated with the beam 24 is represented generally at 26. With this combination of beam 24 and sensor 26 serving to measure only a portion of the load, an initial advantage accrues for the larger spring 11, in that by virtue of this sizing, it can be made immune to load position error, an attribute referred to as being "moment insensitive".

However, investigators have additionally found that the load sharing arrangement of the spring 11 with transmission beam 24, also can be designed to evoke a cancellation of system errors such as hysteresis and creep. The analytical approach to the geometry achieving this advantage requires that the average stress within the flexure components 12 and 14 be equated with the stress within the beam 24 and that the sensor 26, for the purpose of analysis, be considered to be infinitely rigid. Implementation of such a stiff or theoretically infinitely rigid sensor has been through utilization of the earlier noted highly rigid vibrating wire devices or the like. To achieve an equivalency of stress between the flexure beams 12 and 14 and transmission beam 24, resort is commonly made to reduced sections selectively formed therein as are represented at 28a and 28b in connection with flexure component 12; 30a and 30b in connection with flexure component or beam 14; and as at 32 for the case of transmission beam 24.

In accordance with the present invention, however, sensor 26 need not be rigid or highly stiff. Instead, sensor 26 includes an elastic deflectable counterforce 40. Counterforce 40 preferably is formed of materials such as glass/ceramic and the like which exhibit highly error free performance. Deflection of counterforce 40 is detected as a change in capacitance produced by changes in spacing of the plates of a variable capacitor assembly represented generally at 41, the combination representing sensor 26. Because of the limitations of the size of ceramic/glass counterforces as at 40, their practicality is limited with respect to the range of loads which they may weight. With load sharing as now depicted, the error free advantages associated with counterforce 40 may be combined with the moment insensitivity aspects of spring 11 to achieve optimized performance. Counterforce 40 is shown fixed at its end 42 to upright 20 and is connected to the end of transmission beam 24 by a stiff force rod 44. Capacitor assembly 41 is structured in dual sided fashion, having a centrally disposed plate pair supported by an upstanding stud 42. Oppositely disposed spaced capacitor plates are located upon the manually inwardly disposed surfaces of a downwardly depending bifurcate member 43.

Generally, the degree of load sharing or proportioning of load W0 between spring 11 and sensor 26 is predetermined, for example, in accordance with ratio LS:1. A commonly encountered value for LS will be, or example, 9. Under the arrangement shown, counterforce 40 of the sensor 26 is considered for analysis to be a spring which is deflectable under the force applied from transmission beam 24 through stiff force rod 44. Its deflection under such applied force is represented in the drawing as XCERC, while the overall deflection of spring 11 is represented as X0.

With the combinative arrangement represented in FIG. 1, there still, without more, remains a significant rejection of system error by virtue of the error cancellation activity of the transmission beam 24 as operating in concert with the Roberval based spring 11. However, the equalization of stress between these components no longer obtains in the achievement of an optimum weighing device. As is demonstrated herein, a far more desirable condition obtains when the load sharing between the spring 11 and transmission beam 24 are designed with somewhat higher stress occurring in the latter. In the analysis hereafter given, this more optimum condition is identified by an optimization factor, f, which is considered to be the ratio of the stress in the reduced section 32 of the transmission beam 24 to the average stress in the four reduced sections 28a-28b, 30a-30b, of spring 11. Considering the term "average stress" with respect to the beams 12 and 14, it may be considered that the location of load W0 will vary and, as such, the stress in beams 12 and 13 will correspondingly vary. Thus, an average stress for that component is considered to be the average at the reduced sections 28a, 28b, and 30a, 30b. Correspondingly, the stress at transmission beam 24 is considered to be that extant at reduced section 32.

Figure 2:
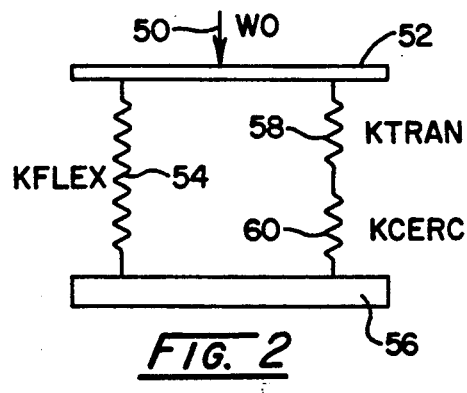
FIG. 2 is a schematic portrayal of a force transfer diagram representing an equivalent force transfer path circuit of the device described in connection with FIG. 1.

For the analysis to follow, a force transfer path based equivalent spring system is employed as represented in FIG. 2. Looking to the figure, the weight W0 again is represented and identified by an arrow 50 as being applied to a force transfer path platform 52. The component within the force transfer path represented by the spring 11 and including beams 12 and 14 with uprights 18 and 20 is represented by spring symbol 54 rigidly supported at 56. The spring representation 54 also is shown exhibiting a spring constant identified as KFLEX. Correspondingly, in parallel force transfer path association, there is provided a spring symbol 58 representing the transmission beam 24 and having a spring constant designated as, KTRAN. Associated in serial force path transfer relationship with the transmission beam symbol 58, is a spring symbol 60 corresponding with the counterforce 40 of sensor 26 for example, a ceramic device, and identified as exhibiting a spring constant, KCERC. For the instant analysis, certain practical values readily are assigned for the performance of components 11, 24, and 40. For example, to obtain a full scale sensing output of sensor 26, the optimized full load and thus full scale displacement, XCERC of counterforce 40 will be known. Typically, for the ceramic based devices this value will be 0.001 inch. Similarly, for broadly employed loading systems, a maximum load may, for example, be 100 pounds for the value W0 and a desired displacement for the system, X0, may be, for example, 0.010 inch, a value which permits the utilization of overload stops and the like which perform within typically encountered manufacturing tolerancing.

Now looking to an ideal model, assuming the values KFLEX, KTRAN and the maximum displacement XCERC, the spring constant of the combination of KTRAN and KCERC is identified as, KCOMB, which may be represented by the relationship:

$$KCOMB = \frac{KCERC \cdot KTRAN}{KCERC + KTRAN} \quad (1)$$

Now letting the displacement of the system and, therefore, the response to the applied load W0 represented as X0 (FIG. 1), the displacement of the system having the combination spring constant, KCOMB will also be, X0, permitting the following relationship to be expressed:

$$X0 \cdot KCOMB = XCERC \cdot XCERC \quad (2)$$

Recall that XCERC, the displacement of counterforce 40 of sensor 26, is a known parameter. The overall system spring rate, K0, may be expressed as:

$$K0 = KCOMB + KFLEX \quad (3)$$

which relates to the applied load as follows:

$$W0 = K0 \cdot X0 \quad (4)$$

Asserting typical parameter values, the value for the counterforce 40 spring constant, KCERC may be developed as follows: For example, let the approximate load sharing ratio, LS=9; let the load capacity, W0, in pounds be equal to 100 pounds; let the counterforce 40 displacement at capacity, XCERC, be equal to 0.001 inch; and a convenient sizing of the spring 11 components will provide a spring constant, KFLEX in pounds per inch as follows:

$$KFLEX = LS \cdot (W0 \cdot 10) \quad (5)$$

where the value, 10, is provided for scaling purposes.

The load sharing ratio value, LS, may be related to the spring constant for the spring 11 and the transmission beam 24 in accordance with the expression:

$$KTRAN = \frac{KFLEX}{LS} \quad (6)$$

Solving for the spring constant of the counterforce 40 from the above expressions provides:

$$KCERC = \frac{\frac{W0}{XCERC} - KFLEX}{1 + \frac{KFLEX}{KTRAN}} \quad (7)$$

For the above assigned parameter values, the spring constants become: KCERC=9,100 pounds per inch, KTRAN is 1,000 pounds per inch, and KFLEX is equal to 9,000 pounds per inch. Recall, however, that the above represents an idealized model.

The analysis now assumes that both the spring 11 and the transmission beam 24 are imperfect springs. By contrast, ceramic material based counterforces 40 employed in sensor 26 because of their demonstrated performance quality, are considered herein to be essentially perfect springs. The amount by which the flexure or guided beam components 12 and 14, as well as the transmission beam 24 are not perfect, may be considered in terms of an error percentage, herein designated, PERR.

Thus, an appropriate spring constant for these error containing components will deviate by a given factor and, in particular, the error exhibited by the transmission beam 24, sized to exhibit slightly more stress, contribute slightly more error. To commence the error based evaluation, the earlier noted optimizing factor, f, is assigned values with respect to values of, i, which, for example, may range in values from 0 to 100, ($i_{max}$).

A given percentage error in the spring constant, KFLEX of the spring 11 will be accompanied by a slightly larger error in KTRAN by the factor, f. The factor, f, then, is applied in conjunction only with the latter transmission component and it will be observed that the maximum error rejection of the system occurs at different values for the factor, f, as the load sharing ratio value, LS, is varied. An expression associating that load sharing proportion with the optimization factor may be expressed as follows:

$$f_i = 1 + i \cdot \frac{LS}{4000} \quad (8)$$

where the number, 4000, is a ranging factor. The factor, f, will range from 1 to the value of expression (8) at $i_{max}$.

The error reflection spring constants then may expressed as follows:

$$KTRANE_I = KTRAN - KTRAN \cdot \frac{PERR}{100} \cdot f_i \quad (9)$$

$$KFLEXE = KFLEX - KFLEX \cdot \frac{PERR}{100} \quad (10)$$

Note, from the above, that the spring constant $KTRANE_i$ reflects and is unique for the factor $f_i$. Thus, there exists a value of KTRANE for every value of i. With the noted error factors associated with both the transmission beam 24 and spring 11, deflection will be different with each and the output representing load will vary. Recall, however, that the output of the sensor 26 will be the output of the system. However, the extent of deflection of counterforce 40 of sensor 26 now will reflect an error which is represented herein as XCERCE for every value of i, $XCERCE_i$.

Recalculation now is made of the counterforce 40 deflection with the spring constants including errors which are denoted by a spring constant symbol in combination with the suffix, E, representing error. Note that the constant, KCERC, for the counterforce 40 as noted above, is assumed to have no error. The following sequence of expressions obtain:

$$KCOMBE_i = KTRANE_i \cdot \frac{KCERC}{KTRANE_i + KCERC} \quad (11)$$

$$K0E_i = KCOMBE_i + KFLEXE \quad (12)$$

$$X0E_i = \frac{W0}{K0E_i} \quad (13)$$

$$FCOMBE_i = KCOMBE_i \cdot X0E_i \quad (14)$$

$$XCERCE_i = \frac{FCOMBE_i}{KCERC} \quad (15)$$

Accordingly, a new deflection of the counterforce 40, $XCERCE_i$ is present for each i. A ratio may be written of the deflection difference between $XCERCE_i$ and XCERC with respect to XCERC and expressed as follows:

$$XCERCERR_i = \frac{XCERCE_i - XCERC}{XCERC} \quad (16)$$

Thus, one may look to the degree or extent of the original error that was introduced, i.e. PERR which is rejected by the system. Expressed otherwise, the degree to which the error PERR is rejected may be given by a rejection ratio, $RR_i$ as follows:

$$RR_i = \frac{PERR}{100 \cdot XCERCERR_i} \quad (17)$$

For further comparative analysis, the maximum value of the array of overall system deflections is shown as:

$$X0E = \max(X0E) \quad (18)$$

Figure 3:
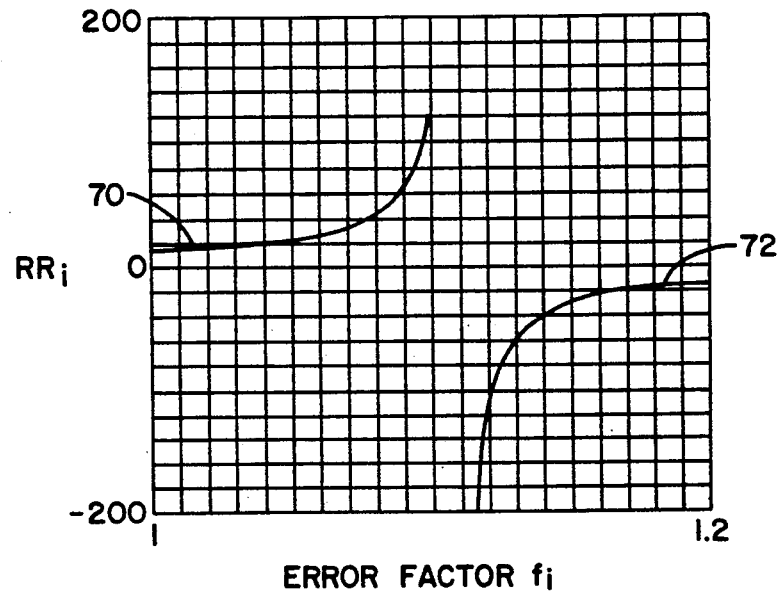
FIG. 3 is a graph relating a ratio of error rejection with an optimizing factor for one load sharing ratio.

Turning to FIG. 3, a graph plotting the rejection ratio, $RR_i$ as a function of the error or optimization factor, f is provided. Two complementary curves as at 70 and 72 are evolved for a parameter selection including a load sharing value, LS of 9. The following parameter values were employed in generating curves 70 and 72.

XCERC=0.001"
X0E=0.0102
PERR=1
KTRAN=100
KFLEX=9000
KCERC=9100

The rejection ratio for a value, f, equal to 1, representing the designs of investigators employing piezoelectric or vibrating string sensors: $RR_0=11.33577$. This shows that with the earlier stress equalization designs, good performance is obtained. However, importantly enhanced performance will be witnessed where the value f is selected evoking a rejection ratio, RR approaching infinity. This value, for the example of FIG. 3, is about 1.1 which corresponds with a value of i of about 490. Thus, the value, 1.1 is approximately at the point of inflection of curves 70 and 72. In effect, a rejection of error for an optimization or error factor of 1 will be at a ratio of about 11:1. Accordingly, about 10% of system error would otherwise remain without alteration in accordance with the instant analysis. Stated otherwise, design under the instant criteria will provide for a stress in the transmission beam 24 which is 1.1 times higher than the average stress in components 12 and 14 of spring 11.

Figure 4:
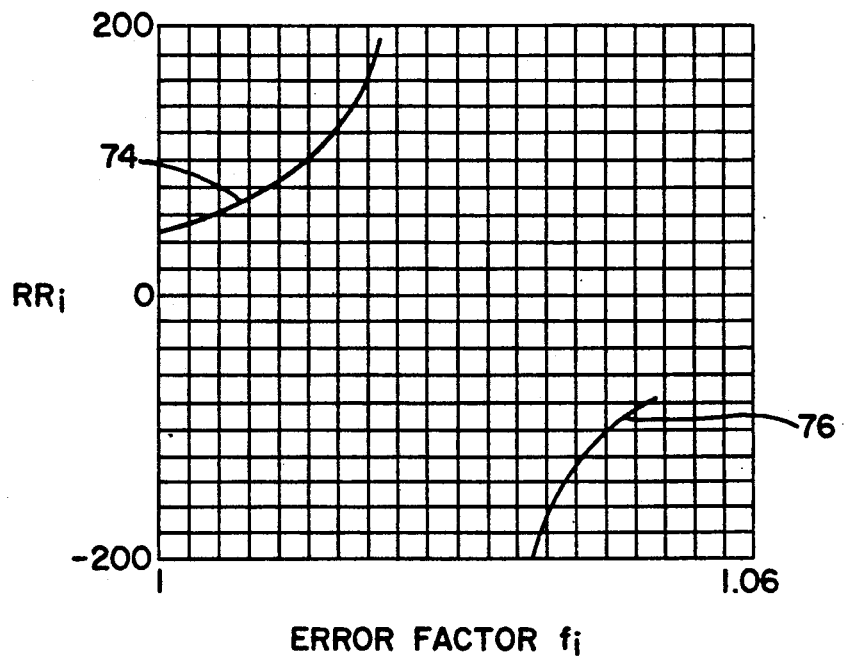
FIG. 4 is a graph relating a ratio of error rejection with an optimizing factor for another load sharing ratio.

Looking to FIG. 4, a similar graph is revealed wherein curves 74 and 76 are plotted based upon a load sharing value, LS equal to 2. The parameter values for this analysis are as follows:

XCERC=0.001
X0E=0.03401
LS=2
KTRAN=1000
KFLEX=2000
KCERC=32667

The point of inflection for the error or optimization factor, $f_i$ for this demonstration is at a value of about 1.03. Note that the stress rejection ratio $RR_0$ value at $f_i=1$ representing earlier structuring increases with respect to the demonstration of FIG. 3 to a value of approximately 51.

Figure 5:
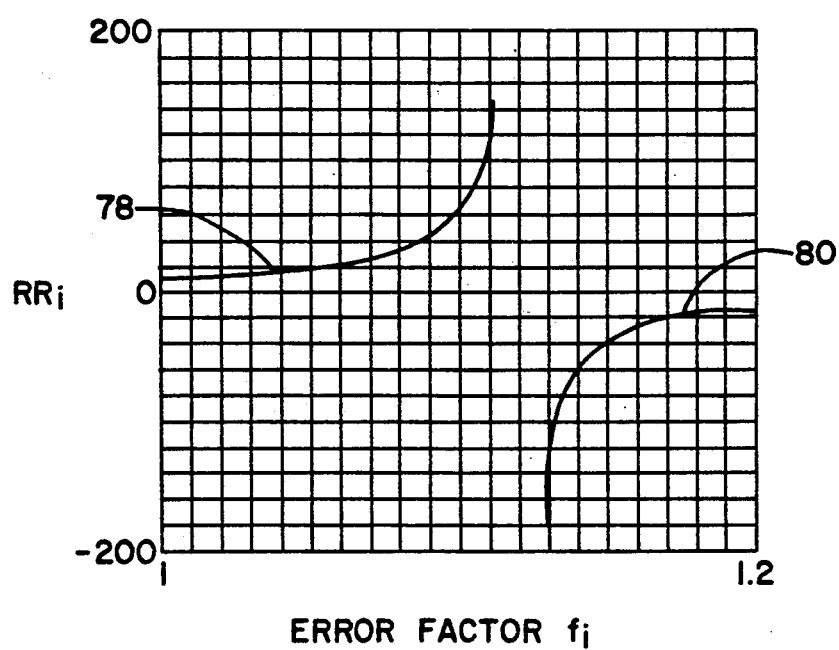
FIG. 5 is a graph relating a ratio of error rejection with an optimizing factor for another load sharing ratio.

Looking to FIG. 5, a similar analysis is presented for a load sharing value, LS equal to 10. In this analysis, the following parameters are developed:

XCERC=0.001
X0=0.00928
LS=10
KTRAN=1000
KFLEX=10000
KCERC=8182

The rejection ratio, $RR_0$ for an error or optimization factor of 1 representing equal stress in spring 11 and transmission beam 24 is about 10 for this model. However, the inflection point for curves 78 and 80 will be seen to be at a value of $f_i$ equal to 1.12 representing an optimization of error rejection for the weighing system 10 of the invention.

Figure 6:
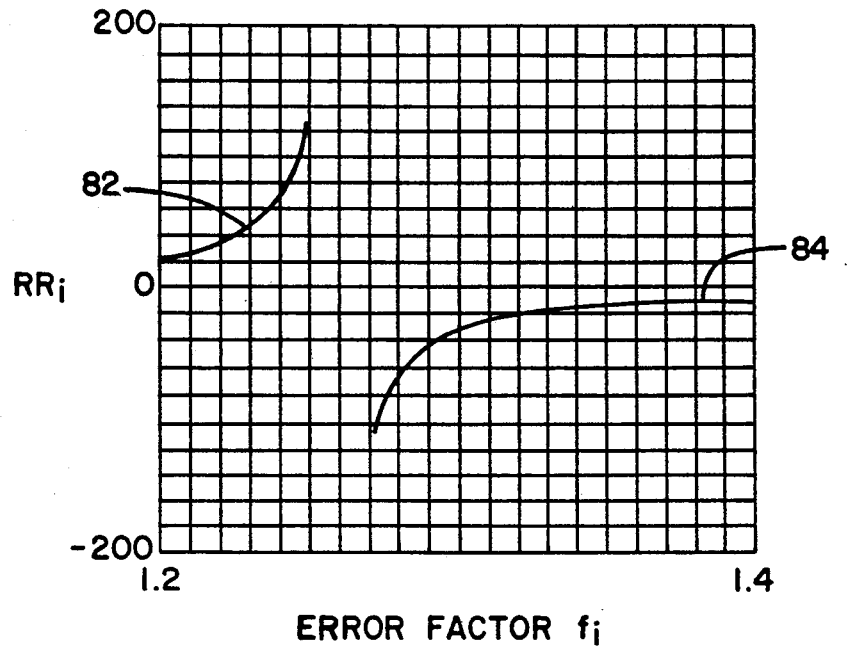
FIG. 6 is a graph relating a ratio of error rejection with an optimizing factor for another load sharing ratio.

Looking to FIG. 6, an analysis is made in conjunction with the selection of a load sharing ratio value, LS, of 20. The parameters involved in this analysis are as follows:

XCERC=0.001
X0E=0.00486
KTRAN=1000
KFLEX=20000
KCERC=3810

The resultant curves 82 and 84 show that for an optimization or error factor of 1 representing selection of equal stresses in the transmission beam 24 and spring 11, a rejection ratio $RR_0$ of about 5 occurs. As compared to an ideal value of infinitely, this represents a relatively low degree of error rejection. However, it may be observed that the curves 82 and 84 represent an inflection point at a value of $f_i$ of about 1.25. Thus, with minor variation of the stress within the transmission beam 24 of the apparatus 10, a substantial improvement in error rejection is recognized for the weighing system of the invention.

Figure 7:
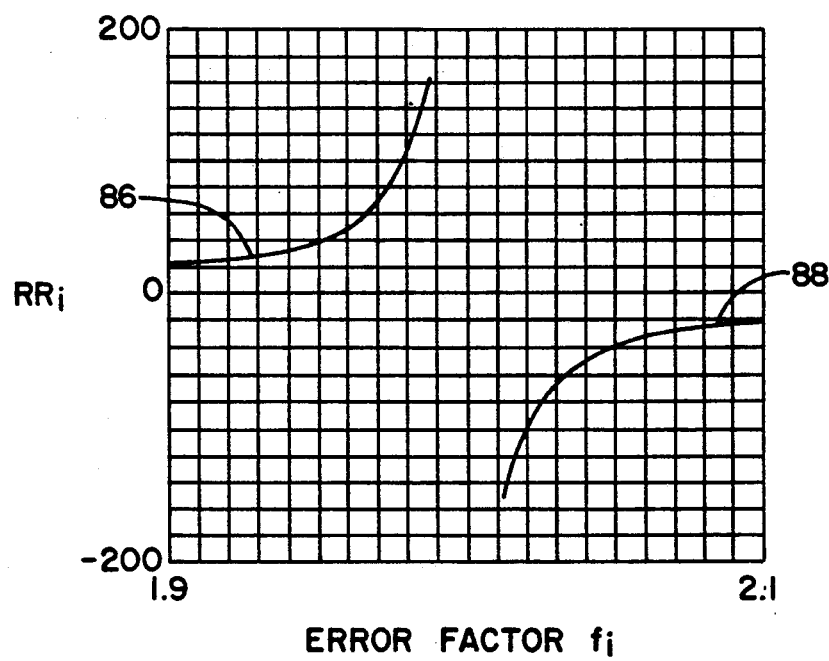
FIG. 7 is a graph relating a ratio of error rejection with an optimizing factor for another load sharing ratio.

Looking to FIG. 7, curves 86 and 88 reveal a rejection ratio variations where a load sharing value, LS, is set at a relatively higher value of 50. The following parameter values are developed for this analysis.

XCERC=0.001
X0E=0.002
KTRAN=1000
KFLEX=50000
KCERC÷980

For an error or optimization factor, $f_i$ of 1, representing equal stress in the spring 11 and transmission beam 24 of the system, a rejection ratio, $RR_0$ of about 2 obtains, a relatively low value. However, the error factor, $f_i$, at the inflection point of curves 86 and 88 where the rejection ratio approaches infinity, has a value of about 2.0.

From the foregoing, it may be observed that where the structures under consideration are designed under earlier criteria wherein the average stress in the spring 11 is made equivalent, a rejection ratio approaching infinity occurs where the sensor is considered to be infinitely stiff or rigid. On the other hand, where an element or sensor 26 is employed such as counterforce 40 having spring characteristics, exhibiting what may be considered a practical stiffness, an importantly improved design occurs with a particular, error rejection based selection of the relative stresses within the transmission beam 24 as related to the average stresses in the spring 11. Preferably, that latter stress is higher by the factor, f, represented in the above analysis. The form of sensor 26 employed with weighing apparatus according to the invention may vary somewhat at the option of the designer. Each, however, is called upon to respond to an elastic response or reaction to load applied in conjunction with a practical load sharing ratio. Movement or deflection is preferably measured by capacitance variation but strain gauges or other transducers may be utilized instead.

Figure 8:
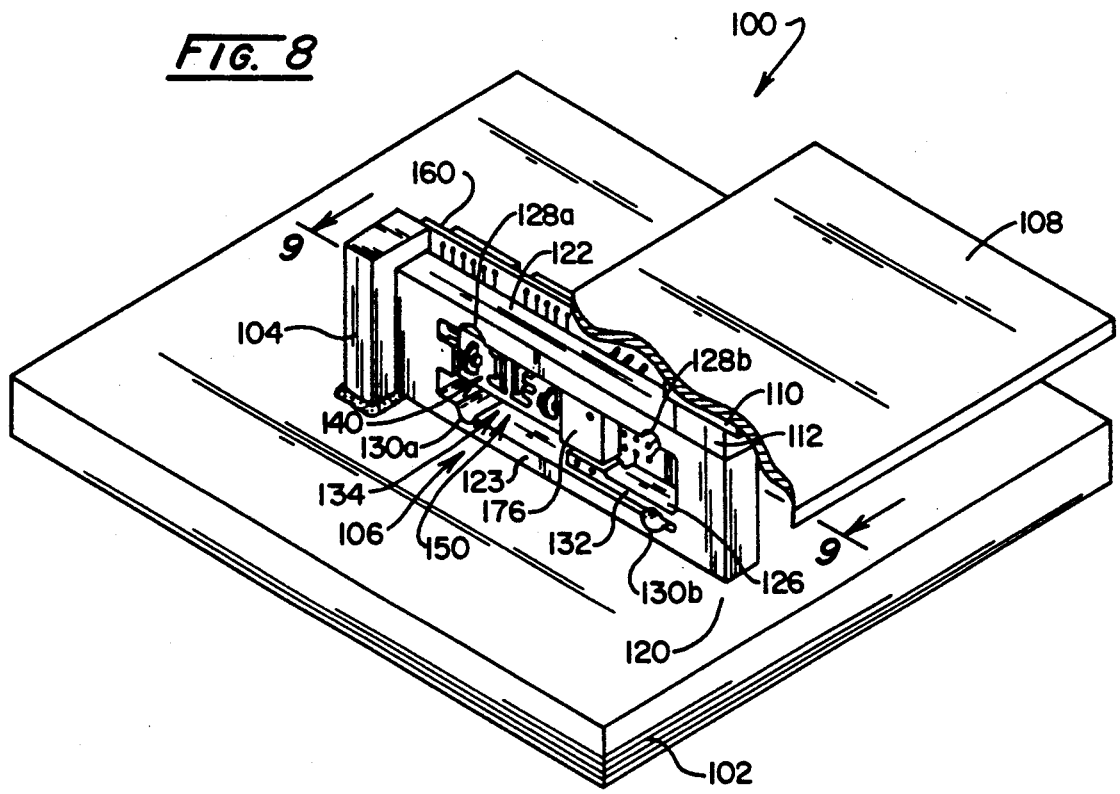
FIG. 8 is a perspective view of load measuring apparatus according to the invention.
Figure 9:
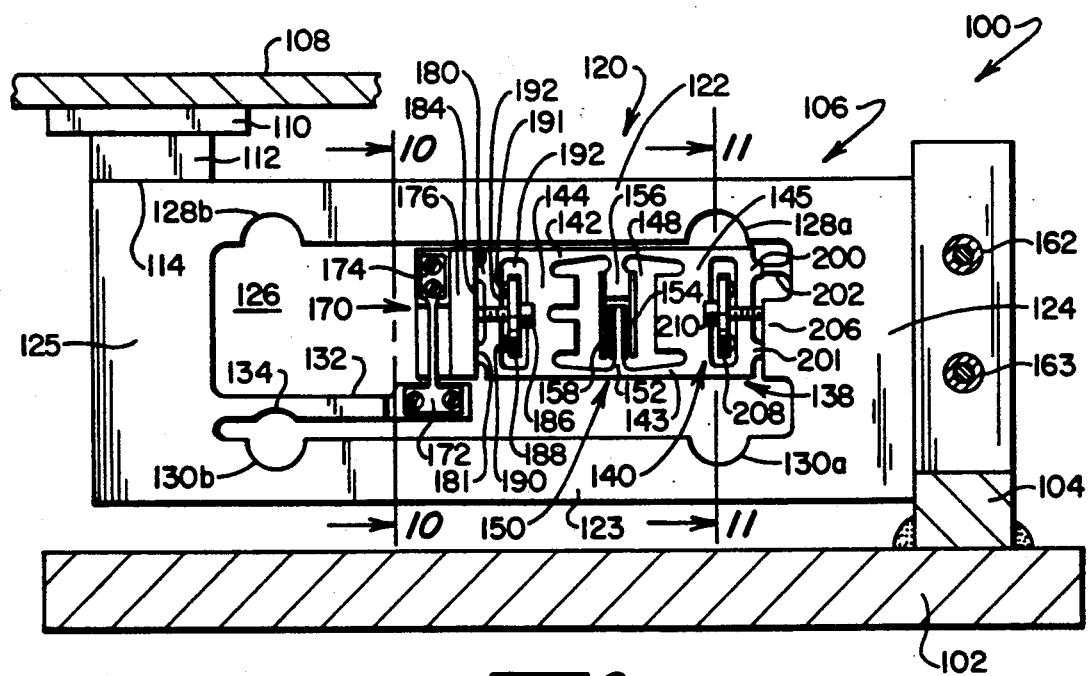
FIG. 9 is a sectional view of the apparatus of FIG. 8 taken through the plane 9—9 shown therein.

Referring to FIG. 8, an embodiment of the invention is revealed in more detail at apparatus 100. The apparatus 100 includes a base or scale ground plate 102 to which is vertically mounted an upright support bar 104. Looking additionally to FIG. 9, support bar 104 functions to retain the weighing structure 106 of the invention in generally vertically oriented, cantilevered fashion by connection therewith through machine bolts (not shown) extending from the rearward surface thereto into the structure 106. Thus, the grounding structure for structure 106 is established. Weights or loads are positioned upon the structure 106 for evaluation at a platter or load receiving arrangement 108 which, as revealed in FIG. 9 is coupled by a stiffener plate 110 and block 112 to the adjacent receiving portion 114 of apparatus 100.

Apparatus 100 includes a spring represented generally at 120 which is structured as a Roberval mechanism having two parallel and spaced guided beam components 122 and 123. These components are formed integrally as a frame with vertical upright components 124 and 125 to define an internally disposed opening 126 therebetween. The average stress in beam 122 is adjusted by reduced sections 128a and 128b, while correspondingly, stress is adjusted within beam component 123 at reduced sections 130a and 130b.

Extending inwardly from upright 125 is an integrally formed transmission beam 132 having a stress adjustment reduced section 134 machined therein.

Spring 120 preferably is formed of popular materials such as aluminum which are readily formed in sizes suited for more practically encountered field weighing applications. By virtue of the Roberval based structure, the spring 120 may be configured to be substantially moment insensitive. In accordance with the invention, spring 120 is combined with a sensor 138 which includes a counterforce 140 in FIG. 9. Counterforce 140 also may be structured to incorporate a parallel guided beam function and, of importance, is formed of a material which is substantially free of system errors such as hysteresis and creep. Those materials may, for example, be provided as a ceramic/glass or beryllium-copper. Counterforce 140 is seen to incorporate an upper guided beam component 142 and a complementary beam component 143 arranged in parallel and spaced with respect thereto. These beams 142 and 143 are formed integrally as a frame structured symmetrically about a vertical, central plane (not depicted) with spaced vertical uprights represented at regions 144 and 145. With the geometry thus shown, an opening 148 is formed within the counterforce 140 essentially at its mid point. Within the opening 148 sensor 138 includes a variable capacitive deflection detection arrangement represented generally at 150. Variable capacitance arrangement 150 is structured as a dual sided capacitor which is formed having a centrally disposed electrode component with an internally disposed electrode present as an upstanding stud 152 formed integrally with beam 143. Stud 152 is electrically insulative when the counterforce 140 is formed of a ceramic. Upon the longitudinally facing sides of the stud 152 are layers 154 of metallic, electrically conductive electrode material. Extending over but spaced from the upstanding stud 152 is a downwardly depending bifurcate member 156 having an electrically conductive metallic layer 158 along its internal surface to define a capacitor with layers 154. Bifurcate member 156 is seen to be integrally formed with guided beam component 142. With the arrangement shown, upon the occasion of a load induced deflection of the counterforce 140, metallic layers 158 and 154 will approach each other in non-contacting relationship on one side of the arrangement 150 and move away from each other on the other side in what may be deemed a "push-pull" physical alteration to vary the overall capacitance of the arrangement. Appropriate circuitry within a circuit board 160 (FIG. 8) detects this alteration of capacitance to convert it to an output signal representative of the weight applied to platform 108. A description of circuitry for generating a signal which is a predetermined function of the capacitance of a sensor capacitor applicable to all embodiments shown herein is described in U.S. Pat. No. 4,054,833, by Briefer, entitled, "Capacitance Measuring System" issued Oct. 8, 1977, and incorporated herein by reference. Looking additionally to FIG. 10, it may be observed that circuit board 160 is mounted close to the capacitance arrangement 150 so as to minimize the length of electrical leads to the front end signal treatment of the signals developed thereby. Note, in this regard, that the circuit board 160 is retained within the apparatus 100 by two stand-offs 162 and 163 which are bolted to upright 104. The three leads leading to the arrangement 150 are revealed at 164 in FIG. 10. By so shortening the length of these leads, spurious capacitances and noise phenomena otherwise derrogating from the developed signal are substantially avoided.

Figure 10:
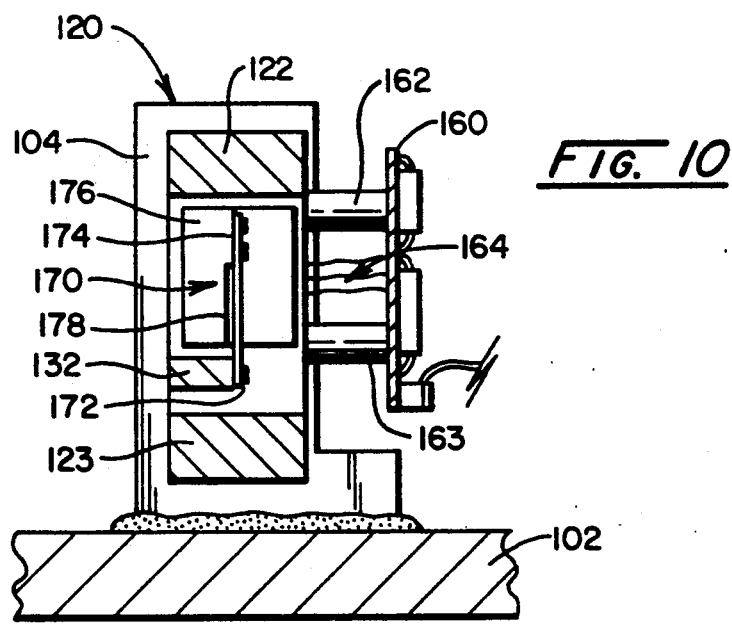
FIG. 10 is a partial sectional view of the apparatus of FIG. 9 taken through the plane 10—10 shown therein.

Force is applied to the counterforce 140 from a load responsive assembly including the transmission beam 132 through a stiff force rod or link 170. FIGS. 9 and 10 reveal that the transmission beam 132 is notched at its outer tip to provide a flat connector surface at a location essentially aligned with a vertical center plane through counterforce 140 such that, when attached, force link 170 is substantially aligned or symmetrical about that center plane. In this regard, FIG. 9 shows that the force link 170 is configured having a horizontally disposed flange or connector portion 172 which is coupled by machine screws to the notched outer tip of transmission beam 132. The link 170 then extends through a reduced rod or section of high tensile strength to extend to an integrally formed, vertically oriented flange or connector portion 174. Flange 174, in turn, is coupled by machine screws to an upwardly disposed connector surface of an L-shaped mounting block 176. FIG. 10 reveals that block 176 is machined away at region 178 to avoid contact with the force link 170. In the latter regard, accommodation is made for the difference in coefficient of thermal expansion of the spring 120, which typically is formed of aluminum, and the counterforce 140 which typically is configured from a ceramic material. While the thin central portion of force link 170 is quite rigid in tension or in response to vertically imposed forces, it is flexible with respect to horizontal increments of movement resulting from the noted difference of coefficient of expansion. Block 176 may be formed of a metal such as aluminum so that it may receive and rigidly retain the mounting screws extending therein from flange 174. An advantageous aspect of the above-described mounting structure resides in its accessibility to the fabricator through the opening 126. All connections requiring the use of screwdrivers and the like are readily carried out by access through opening 126.

Figure 12:
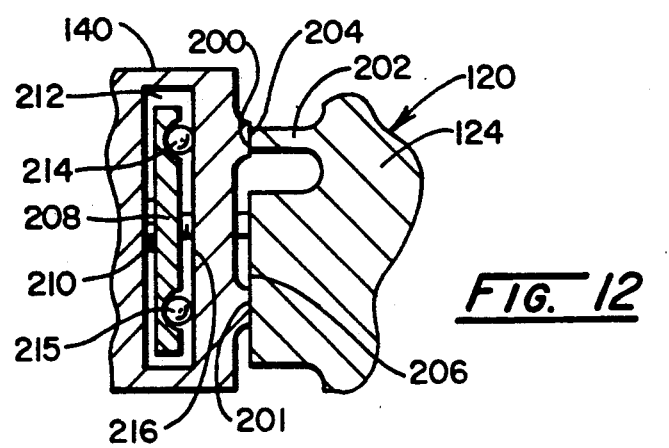
FIG. 12 is a partial sectional view of the apparatus of FIG. 11 taken through the plane 12—12 shown therein.

To mount the block 176 upon the deflectable end of counterforce 140, an abutting association between the two is called for, inasmuch as the ceramic material from which counterforce 140 typically is configured generally is unsuitable to receive fasteners such as machine screws and the like. Accordingly, the deflectable end of counterforce 140 is configured having two integrally formed and outwardly depending flat contact regions of diminished area extent 180 and 181. Contact regions 180 and 181 are seen to be in abuttable contact with a flat surface 184 of block 176. This contact between surface 184 and flat contact regions 180 and 181 is maintained in tight compression by paired connectors such as machine screws 186 which extend through a compression plate 188 into mounting block 176. Plate 188 is configured having two vertically spaced contact components, such as hemispherically shaped dimples 190 and 191 which function to make contact with an internally disposed contact surface 193 of counterforce 140 within connector opening 192 therein. As another contact forming arrangement, the dimples or detents 190 and 191 may be reversed in the manner of compression plate 208 as seen in FIG. 12 for the purpose of receiving rigid balls as shown therein at 214 and 215. The latter arrangement provides for enhanced accommodation for relative expansive and contractive movement between the joined members. With the arrangement shown, by tightening the paired machine screws 186, compression plate 188 pulls block 176 into contact with contact regions 180 and 181 to form two restricted area regions of compressive contact. Similarly, contact components 190 and 191 are urged into compressive contact with discreet regions of limited area extent upon contact surface 193. By so providing these restricted area contact regions of compressions, as well as the flat contact regions of diminished area extent 180 and 181, a substantially high unit pressure is achieved to enhance the frictional coupling between block 176 and counterforce 140. This arrangement aids in overcoming slippage, particularly, which may otherwise be encountered in consequence of environmental temperature excursions. In particular, it is desirable to avoid any slippage during initial performances of the device wherein a minor slippage will evoke a different zero position for the system. The contact components dimples 190 and 191 may also be provided by small balls formed of steel or similar hard material positioned within hemispherical indents within compression plate 188. This arrangement is shown in conjunction with the mounting of the opposite or non-deflecting end of the counterforce 140.

Figure 11:
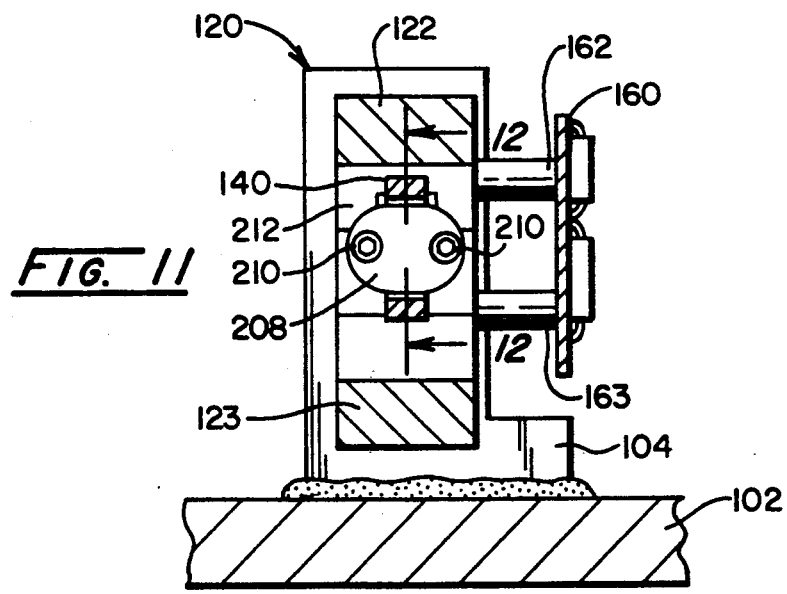
FIG. 11 is a partial sectional view of the apparatus of FIG. 9 taken through the plane 11—11 shown therein.

Looking additionally to FIGS. 11 and 12, the latter mounting is depicted. As before, counterforce 140 is configured having two vertically spaced flat contact regions of diminished area extent 200 and 201 which abuts against the vertical receiving surface or connection portion of upright components 124 of spring 120. Note, however, that upright 124 is configured having an upwardly disposed integrally formed contact beam 202, the outer surface of which at 204 abuts against the upwardly disposed contact region 200 of counterforce 140. Correspondingly, the lower abutting surface 206 of upright 124 is of relatively larger vertical extent and serves to provide compressive abutting contact with lower disposed contact region 201 of the counterforce 140. This arrangement provides for a differential of thermal expansion and contraction between counterforce 140 and upright 124 as considered in a vertical direction. In this regard, the cantilevered thinner beam structure 202 may flex vertically to maintain compressive abuttable contact with region 200 without inducing slippage between the counterforce 140 and upright 124.

Retention of the counterforce 140 in compression against the upright 124, as before, is carried out through utilization of a compression plate 208 which is provided in conjunction with paired connectors such as machine screws 210. Compression plate 208 is seen to be located and extend through a connector opening 212 within counterforce 140 and the paired machine screws 210 are seen to extend on either side of that counterforce 140 for engagement with upright 124. For the instant embodiment, however, in place of the earlier described dimples 190 and 191, small rigid balls such as ball bearings as seen at 214 and 215 are arranged in vertical alignment for contact with the vertically disposed surface of counterforce 140 within connector opening 212. Hemispherical detents are provided within the compression plate 208 to accommodate balls 214 and 215. Note that the radii of the hemispherical detents with which balls 214 and 215 are placed are greater than the corresponding radii of the balls themselves. Also, it may be observed that ball 214 is centrally aligned with region 200 and ball 215 is centrally aligned with region 201. As before, with the arrangement shown, a high compressive pressure is evoked in the restricted regions of contact of the balls 214 and 215 with the corresponding contact surface 216 of counterforce 140 within connector opening 212. Similarly, the earlier-described high compressive pressure evoking a higher frictional contact is achieved with the limited regions 200 and 201 of counterforce 140 as they are retained in compressive abutment against upright 124.

Figure 13:
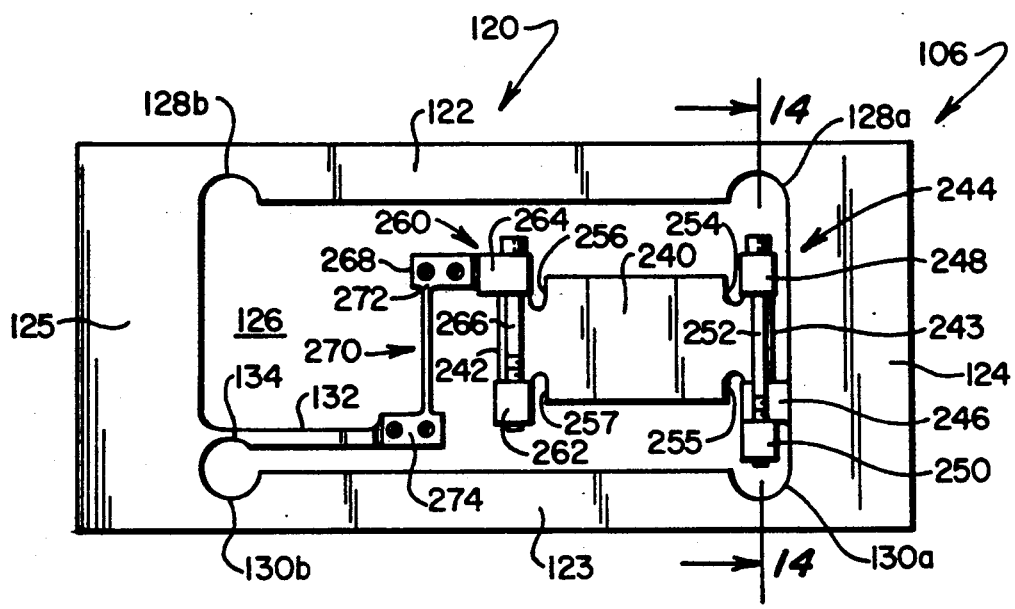
FIG. 13 is a side elevational, partially schematic view of weighing apparatus according to the invention showing another embodiment for sensor mounting.
Figure 14:
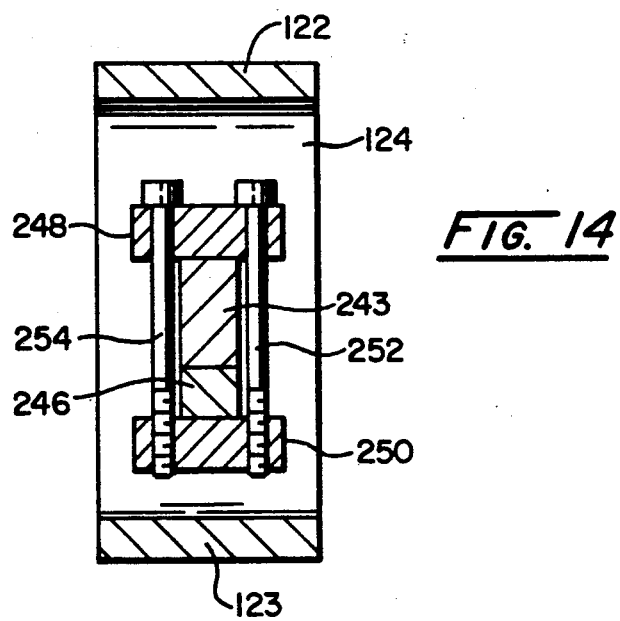
FIG. 14 is a sectional view of FIG. 13 taken through the plane 14—14 shown therein.

Turning to FIGS. 13 and 14, another embodiment for mounting the sensor 138 within the structure 106 is revealed. Here, the spring component 120 again is identified, where appropriate, with the same numeration as heretofore employed. However, the counterforce is represented at 240 and, is seen to have a differently configured outer periphery. The centrally disposed transducer and individual guided beams heretofore described in connection with sensor 138 are not illustrated in FIG. 13 in the interest of clarity. However, those components will be present. Counterforce 240 is seen to be configured having two longitudinally spaced, isolated compression mounts 242 and 243. Mount 243 is compressively retained by a split clamp assembly 244 upon an inwardly depending stud 246 extending within opening 126. FIG. 14 reveals that the mounting arrangement or split clamp assembly 244 includes respective upper and lower clamp bars 248 and 250 which retain lower disposed mounting surface of the compression mount 243 against the upwardly disposed receiving surface of stud 246 by compression induced from paired machine screws 252. Note that clamp bar 250 is positioned in compression against the lower disposed contact surface of stud 246, while clamp bar 248 is positioned in compression against the upper mounting surface of compression mount 243. It may be observed that the compressive effects imposed by the split clamp assembly 244 upon counterforce 240 which, otherwise, might deform the guided beam features thereof to induce irregularity such a pre-tensioning of the outwardly disposed guided beam components are isolated in the structure by oppositely disposed upper and lower isolation slots 254 and 255. In similar fashion, FIG. 13 reveals the presence of corresponding isolation slots 256 and 257 serving to isolate the prestressing effects imposed upon compression mount 242 by a split clamp assembly 260 formed of a clamp bar 262 and L-shaped clamp-connector bar 264. Bars 262 and 264 are compressively retained against the oppositely disposed mounting surfaces of compression mount 242 by paired connectors such as machine screws, one of which is shown at 266. The machine screws as at 266 are employed in the same manner as machine screw pair 252. Block 264 is seen having a connector extension at 268 which is attached to a horizontal flange 272 forming the upper connector for force rod 270. Similarly, a horizontal flange 274 couples the force link 270 at its lowermost extent to the transmission beam 132. As in the earlier embodiment, the force link 270 is maintained essentially at the vertical center line of counterforce 240. Force link 270 thus performs in the same manner as the assembly 170 earlier described.

Turning to FIGS. 15–17, another embodiment for mounting the sensor 138 within the structure 106 is revealed. Here, the spring 120 again is identified, where appropriate, with the same numeration as heretofore employed. However, the counterforce is represented at 300 and, is seen to have a periphery corresponding with that described earlier at 140 in conjunction with FIG. 9. The centrally disposed transducer and individual guided beam heretofore described in connection with counterforce 140 are not illustrated in FIG. 15 in the interest of clarity. However, those components or their equivalent will be present.

Counterforce 300 is seen to be situated lower within the internally disposed opening 126 of spring 120. The mounting between the components, however, is similar to that described in conjunction with FIG. 9. In effect, the upright 124 provides a support assembly with a vertically disposed portion having a lower abutting surface 302 and a contact beam 304. Correspondingly, the upright 306 of counterforce 300 is configured having two vertically spaced flat contact regions of diminished area extent 308 and 310 which are positioned in abutment respectively with surface 302 and beam 304. As before, this arrangement provides for a differential or thermal expansion and contraction between the counterforce 300 and the upright 124 as considered in a vertical direction. The mounting arrangement, as in the embodiment of FIG. 9, includes the provision of a connector opening 312 adjacent upright 306 of the counterforce 300. Within the opening 312 there is positioned a compression plate 314 which is provided in conjunction with paired connectors, one of which is shown at 316 threadably engaged with the upright 124. Association between the deflectable end of counterforce 300 at upright 318 and the transmission beam 132 is through a mounting block/force rod assembly represented generally at 320. The mounting block component 322 of assembly 320 is configured having a somewhat triangular shape with one mounting portion being formed as a surface region 324, the lower portion thereof being seen in FIG. 17 to include a contact beam 326 and a lower abutting surface 328. Beam 326 and surface 328 are shown to be in abutment against corresponding respective flat contact regions 330 and 332 formed upon the upwardly disposed surface of upright 318 of sensor 300.

An abutting or compressive coupling between the assembly 320 and counterforce 300 is provided in the earlier described manner by a compression plate 334 which is inserted within connector opening 336. Plate 334 may be provided with spherically shaped contact components to be urged in abutting compression against the contact surface 338 within opening 336. Machine screws, one of which is revealed at 340 extend on either side of the counterforce 300 into threaded openings within the assembly 320, such openings being revealed at 342 and 344 in FIG. 16.

Mounting block 322 is seen to extend upwardly above counterforce 300 and then extends generally normally outwardly therefrom to establish a top mounting portion represented generally at 346. Mounting portion 346 functions to provide a flat connector surface as seen in FIG. 17 at 348. Connector surface 348 is drilled and tapped at 350 and 352 to receive two machine screws shown respectively at 354 and 356 which retain the upper flange 358 of a force rod 360. FIG. 16 reveals that the machine screws as at 354 and 356 are inserted within bores, one of which is revealed at 361 extending in the top mounting portion 346. The figure also reveals that the force rod 360 resides in a centrally disposed slit 362 in the top mounting portion 346. Additionally, FIGS. 16 and 17 reveal that the rod 360 extends within a notch 364 formed within block 320. The bottom flange 366 of the force rod 360 is coupled to a corresponding flat connector surface of transmission beam 132 by two machine screws 368 and 370.

With the arrangement shown, differentials of thermal expansion and contraction are accommodated for with respect to the different materials employed.

Since certain changes may be made in the above-described, method and apparatus without departing from the scope of the invention herein involved, it is intended that all matter contained in the description thereof or shown in the accompanying drawings shall be interpreted as illustrative and not in a limiting sense.

We claim:

1. Weighing apparatus for measuring load force applied to a receiving portion thereof and having a force communication path to ground, comprising:
   first spring means within said force communication path, coupled in force transfer relationship between said receiving portion and ground and deflectable under said load force to exhibit a first value of stress, for providing force transfer response to said load force;
   a sensor positioned within said path to deflect under an applied force to generate an output correlatable with the force value of said load force; and
   a transmission spring within said path in parallel force relationship with said first spring and in series force relationship with said sensor for asserting an applied force upon said sensor while exhibiting a second value of stress greater than said first stress value exhibited by said first spring by an amount effective to cause substantial cancellation of error within the weighing apparatus including said first and said transmission spring.

2. The weighing apparatus of claim 1 in which said transmission spring is in load sharing relationship with said first spring in accordance with the ratio 1:LS, where LS is a predetermined load sharing ratio value.

3. The weighing apparatus of claim 2 in which said second stress value is selected having a value greater than said first stress value by an optimization factor, f, where said factor, f, corresponds with an optimized rejection of said error within said force transfer system for said ratio 1:LS.

4. The weighing apparatus of claim 2 in which said second stress value is selected having a value greater than said first stress value by an optimization factor, f, where said factor, f, corresponds with an optimized rejection of said system error for said ratio 1:LS and has a value greater than 1.

5. The weighing apparatus of claim 1 in which said sensor comprises a counterforce formed of non-metallic material configured in guided beam fashion and having a transducer operatively associated therewith to vary in capacitance in response to deflection of said counterforce to generate said output.

6. The weighing apparatus of claim 5 in which said non-metallic material is a ceramic material.

7. The weighing apparatus of claim 1 in which said first spring is configured having two, substantially parallel guided beams associated with spaced uprights to define a parallelogramic frame in force transfer communication between said receiving portion and said ground.

8. The weighing apparatus of claim 7 in which said first spring is formed of a metal and is configured having a size selected with respect to said load force applied to said receiving portion effective to substantially minimize moment error induced by the position of said load upon said receiving portion.

9. The weighing apparatus of claim 7 in which said transmission spring comprises a beam having a cross-sectional dimension selected for deriving said second value of stress and integrally formed with said first spring.

10. The method for optimizing the rejection of system error within a weighing mechanism having a receiving portion for receiving a load, a first spring within a force transfer path extending from said receiving portion to ground, comprising the steps of:
providing said first spring in series force transfer relationship between said receiving portion and ground;
configuring said first spring to have an average first stress under said load;
providing a sensor in series force transfer relationship within said path between said receiving portion and ground and in parallel force transfer relationship with said first spring within said path; for providing an output signal corresponding with said load;
providing a transmission member within said path in series force transfer relationship with said sensor to assert said applied force thereupon and in parallel force transfer relationship with said first spring; and
configuring said transmission member to have a second stress greater than said average first stress by an amount effective to cause substantial cancellation of said system error.

11. The method of claim 10 in which said configuring said transmission member to have a second stress greater than said average first stress is by an amount effective to cause substantial cancellation of hysteresis and creep based system error.

12. The method of claim 10 in which said transmission member is a spring provided in load sharing relationship with said first spring in accordance with the ratio, 1:LS; and said second stress is selected as greater than said average first stress by an optimization factor, f, where said factor, f corresponds with an optimized rejection of said system error for said ration, 1:LS.

13. The method of claim 10 in which said sensor includes a counterforce deflectable under load and means for measuring such deflection.

14. The method of claim 11 in which said sensor responds to said deflection to derive a capacitance-based output signal.

15. Weighing apparatus for measuring the weight of a load, comprising:
a first spring having a receiving portion for receiving said load in force transfer relationship and present within a force transfer path extending to ground;
a sensor elastically deflectable under an applied force and including a transducer responsive to said deflection to generate an output corresponding with said load weight; and
a deflectable transmission member coupled in series force transfer relationship with said sensor and in parallel force transfer relationship with said first spring within said force transfer path and configured for effecting assertion of a portion of said applied force to said sensor.

16. The weighing apparatus of claim 15 in which:
said first spring is configured having two, substantially parallel guided beams associated with spaced uprights to define a parallelogram frame; and
said sensor includes a counterforce formed of non-metallic material and is configured in guided beam fashion to define a deflectable parallelogram frame.

17. The weighing apparatus of claim 15 in which:
said first spring is formed of metal; and
said sensor is formed of ceramic material and said transducer is configured to vary in capacitance in response to said sensor deflection.

18. The weighing apparatus of claim 15 in which said transmission member comprises a beam fixed in cantilever fashion to said first spring.

19. The method for making apparatus for measuring the weight of a load comprising the steps of:
providing a first spring having a receiving portion for receiving said load in force transfer relationship;
positioning said first spring within a force transfer path extending to ground;
providing a sensor elastically deflectable under an applied force to generate an output corresponding with said load weight;
providing a deflectable transmission spring configured for effecting assertion a portion of said applied force to said sensor;
positioning said sensor and said transmission spring within said force transfer path; and
coupling said transmission spring in series force transfer relationship with said sensor and in parallel force transfer relationship with said first spring.

20. The method of claim 19 wherein:
said first spring is provided having two, substantially parallel guide beams associated with spaced uprights to define a parallelogram; and
said sensor is formed of non-metallic material and is provided having a guided beam, deflectable parallelogram configuration.

21. The method of claim 20 wherein:
said first spring is formed of metal;
said sensor is formed of ceramic material; and is configured to vary in capacitance in response to said sensor deflection.

22. The method of claim 20 wherein said transmission spring is provided as a beam and is fixed in cantilever fashion to one said first spring upright.

23. Weighing apparatus for measuring the weight of a load, comprising:
- a first spring having a receiving portion for receiving said load within a force transfer path and configured with parallel, spaced beam components and spaced uprights extending therebetween to define a parallelogram having an opening;
- a sensor in parallel relationship with said first spring within said force transfer path, having spaced parallel beam components within a parallelogramic frame symmetrically disposed about a central plane within said opening and extending longitudinally between a fixed and a deflectable end receiving an applied load for deriving an output corresponding with said load;
- a transmission beam within said transfer path for transmitting a portion of said load to said sensor, said beam being situate within said opening, having a fixed end and extending therefrom to an oppositely disposed deflection end having a first connector surface facing outwardly through said opening;
- mounting means within said opening, fixed to and moveable with said sensor and having a second connector surface facing outwardly through said opening and in alignment with said first connector surface; and
- a force rod including first and second spaced connector portions facing and accessible through said opening, said first connector portion being connected with said first connector surface and said second connector portion being connected with said second connector surface and configured for conveying said applied load.

24. Weighing apparatus according to claim 23 in which said force rod first and second connector portions are configured as flanges and said connections with respective said first and second connector surfaces are by threaded connectors accessible through said opening.

25. Weighing apparatus according to claim 23 in which said first and second connector surfaces are positioned to locate said force rod in alignment with said central plane.

26. Weighing apparatus according to claim 25 in which said mounting means comprises a mounting block connected with said sensor and having said first connector portion as a surface thereof facing for access outwardly through said opening.

27. Weighing apparatus according to claim 26 in which:
- said sensor is configured having a first connector opening adjacent said deflectable end defining a contact surface; and
- said mounting means includes a connector assembly comprising a compression plate positioned within said first connector opening, having rigid, spherically shaped contact components therewith positioned in compressible contacting abutment with said contact surface, and compressing connector means extending between said compression plate and said mounting block for compressibly retaining said mounting means against said sensor.

28. Weighing apparatus according to claim 23 in which:
- said sensor is configured having a second connector opening adjacent said fixed end defining a contact surface;
- said first spring is configured having a connection portion within said opening at a select said upright;
- including a compression plate positioned within said second connector opening, having rigid, spherically shaped contact components therewith positioned in compressible contacting abutment with said contact surface, and compressing connector means extending between said compression plate and said spring component connection portion for compressibly retaining said sensor fixed end against said spring component connection portion.

29. Weighing apparatus according to claim 23 in which:
- said sensor is configured having an integrally formed compression mount including first and second vertically oppositely disposed mounting surfaces, said mount being adjacent said deflectable end and isolated from said beam components by oppositely disposed slots located substantially therebetween; and
- said mounting means includes a split clamp assembly having a first clamp bar positioned transversely upon said first mounting surface and extending within said opening to provide said second connector surface, a second clamp bar positioned transversely upon said second mounting surface in alignment with said first clamp bar, and paired fastener means connected between said first and second clamp bars for compressively drawing them into securing engagement with said compression mount.

30. Weighing apparatus according to claim 23 in which:
- said first spring is configured having a connection portion within said opening and extending from a said upright;
- said sensor is configured having an integrally formed compression mount including first and second vertically oppositely disposed mounting surfaces, said mount being adjacent said fixed end, isolated from said beam components by oppositely disposed slots located substantially therebetween, and said second mounting surface being positioned in abutting adjacency upon one side of said spring component connection portion; and
- including a split clamp assembly having a first clamp bar positioned transversely upon said first mounting surface, a second clamp bar positioned transversely upon another said side of said spring component connection portion in alignment with said first clamp bar, and paired fastener means connected between said first and second clamp bars for compressively drawing them into securing engagement with said connection portion and said compression mount.

31. Weighing apparatus as claimed in claim 15 wherein said sensor is formed of a first material, and is configured having spaced, parallel beam components extending longitudinally between one upright at a deflectable end and another upright at a fixed end;
a support assembly formed of a second material including a stud component having an upwardly disposed receiving surface and an oppositely disposed contact surface;

said sensor being configured having an integrally formed first compression mount including first and second vertically oppositely disposed mounting surfaces located adjacent said fixed end, isolated from said beam components by oppositely disposed slots located therebetween and said second mounting surface being positioned in abutting adjacency with said support assembly upwardly disposed receiving surface; and mounting means for providing compressive retention between said compression mount first mounting surface and said stud component contact surface.

32. The weighing apparatus of claim 31 in which said mounting means comprises a split clamp assembly having a first clamp bar positioned transversely upon said compression mount first surface, a second clamp bar positioned transversely upon said support assembly oppositely disposed contact surface, and paired fastener means connected between said first and second clamp bars for compressively drawing them into securing engagement with said stud component and said compression mount.

33. The weighing apparatus of claim 31 in which:
said sensor is a load cell and said apparatus includes a load responsive assembly for transmitting a force to said sensor deflectable end;
said sensor is configured having an integrally formed second compression mount including vertically oppositely disposed mounting surfaces located adjacent said deflectable end and isolated from said beam components by oppositely disposed slots located therebetween; and
including mounting means compressibly engaged with said second compression mount mounting surfaces and coupled to said load responsive assembly for transmitting said force to said sensor.

34. The weighing apparatus of claim 33 in which said mounting means comprises a split clamp assembly having a first clamp bar positioned transversely upon said compression mount first surface, a second clamp bar positioned transversely upon said compression mount second surface, and paired fastener means connected between said first and second clamp bars for drawing them into securing engagement with said compression mount.

35. The weighing apparatus of claim 31 in which:
said sensor is a load cell configured having a connector opening adjacent said deflectable end defining a contact surface adjacent a said upright;
said apparatus includes a load responsive assembly including a mounting block for transmitting a force to said load cell deflectable end; and
including a connector assembly comprising a compression plate positioned within said connector opening, having contact components therewith positioned in compressible contacting abutment with said contact surface and including compressing connector means extending between said compression plate and said mounting block for compressibly retaining said mounting block against said load cell deflectable end.

36. Weighing apparatus as claimed in claim 15 wherein said sensor is configured having spaced, parallel beam components extending between one upright at a deflectable end and another upright at a fixed end;

a support assembly having a vertically disposed connection portion;
said sensor being configured having a first connector opening adjacent said fixed end defining a first contact surface adjacent a said upright; and
a mounting assembly including compression plate positioned within said first connection opening, having contact components therewith positioned in compressible contacting abutment with said first contact surface, and first compressing connector means extending between said first compression plate and said support assembly vertically disposed connection portion for compressibly retaining said sensor fixed end against said connection portion.

37. Weighing apparatus of claim 36 in which:
said sensor is a load cell configured having a second connector opening adjacent said deflectable end defining a second contact surface adjacent a said upright;
said apparatus includes a load responsive assemble including a mounting block for transmitting a force to said load cell deflectable end; and
including a connector assembly comprising a second compression plate positioned within said second connector opening, having contact components therewith positioned in compressible contacting abutment with said second contact surface and including second compressing connector means extending between said second compression plate and said mounting block for compressibly retaining said mounting block against said load cell deflectable end.

38. Weighing apparatus of claim 36 in which:
said apparatus includes a load responsive assembly for transmitting a force to said sensor deflectable end;
said sensor is a load cell configured having an integrally formed compression mount including vertically oppositely disposed mounting surfaces located adjacent said deflectable end and isolated from said beam components by oppositely disposed slots located therebetween; and
including mounting means compressibly engaged with said compression mount mounting surfaces and coupled to said load responsive assembly for transmitting said force to said load cell.

39. Weighing apparatus as claimed in claim 15 wherein said sensor is configured having spaced, parallel beam components extending between one upright at a fixed end and another upright of predetermined vertical extent at a deflectable end;
a support assembly having a vertically disposed portion fixed in supporting relationship to a said upright adjacent said load cell fixed end;
a mounting block having a first mounting portion engageable with a said sensor upright at said deflectable end and extending upwardly therefrom a predetermined lengthwise extent greater than said predetermined vertical extent to a second mounting portion generally normally disposed outwardly from said first mounting portion;
connector means for coupling said mounting block first mounting portion with said sensor upright at said deflectable end;
a force rod of length substantially coextensive with said predetermined distance and extending between a first connector portion coupled to said mounting block second mounting portion and a lower disposed second connector portion connected with a load conveying assembly.

40. The weighing apparatus of claim 39 in which:

said sensor is a load cell configured having a connector opening adjacent said deflectable end providing a contact surface at an adjacent said upright; and said connector means includes a connector assembly comprising a compression plate positioned within said connector opening, having contact components therewith positioned in compressible contacting abutment with said contact surface, and compressing connector means extending between said compression plate and said mounting block for compressibly retaining said mounting block against said load cell.

41. The weighing apparatus of claim 39 in which:

said sensor is a load cell symmetrically disposed about a vertical central plane; and said mounting block first mounting portion is configured to locate said force rod in alignment with said central plane.

42. Weighing apparatus as claimed in claim 15 wherein said sensor is configured having spaced, parallel beam components extending between one upright at a fixed end and another upright at a deflectable end, said uprights being symmetrically disposed about a central plane;

a support assembly having a vertically disposed portion fixed in supporting relationship to said upright adjacent said sensor fixed end;

a mounting block having a mounting portion engageable with a said sensor upright at said deflectable end and a first connector surface adjacent to and parallel with said central plane;

connector means for coupling said mounting block mounting portion with said sensor upright at said deflectable end;

a force rod including first and second connector portions, said rod being symmetrically disposed about said central plane, said first connector portion being connected with said first connector surface and said second connector portion being connected with a second connector surface of a load conveying assembly.

43. The weighing apparatus of claim 42 in which said first and second connector portions are configured as flanges and said connections with respective first and second connector surfaces are by threaded connectors.

44. The weighing apparatus of claim 42 in which:

said sensor is load cell configured having a first connector opening adjacent said deflectable end defining a contact surface; and said connector means includes a connector assembly comprising a compression plate positioned within said first connector opening, having rigid, spherically shaped contact components therewith positioned in compressible, contacting abutment with said contact surface, and compressing connector means extending between said compression plate and said mounting block for compressibly retaining said mounting means against said load cell.

* * * * *